United States Patent [19]

Löfmark

[11] Patent Number: 4,908,854
[45] Date of Patent: Mar. 13, 1990

[54] APPARATUS FOR CONNECTING AND DISCONNECTING A RINGING SIGNAL TO A CALLED SUBSCRIBER

[75] Inventor: Bengt G. Löfmark, Skärholmen, Sweden

[73] Assignee: Telefonaktiebolaget L M Ericsson, Stockholm, Sweden

[21] Appl. No.: 242,979

[22] Filed: Sep. 12, 1988

[30] Foreign Application Priority Data

Oct. 8, 1987 [SE] Sweden .................... 8703890

[51] Int. Cl.⁴ .................... H04M 1/74; H04M 3/00
[52] U.S. Cl. .................... 379/373
[58] Field of Search .................... 379/383, 373

[56] References Cited

U.S. PATENT DOCUMENTS 4,152,549  5/1979  Ceruti et al. .................... 379/373

*Primary Examiner*—Stafford D. Schreyer
*Attorney, Agent, or Firm*—Burns, Doane, Swecker & Mathis

[57] ABSTRACT

The present invention relates to an apparatus in ringing signaling to a called subscriber. Connection and disconnection of the signal takes place with the aid of the apparatus. The problem solved by the invention is that of current transients being generated on disconnection of the signal, these transients causing a disturbing clicking noise in the engaged telephone of a subscriber in a neighboring channel. The apparatus solving the problem includes a two-way switching circuits (10) connected in series with an AC voltage generator (2), said circuit disconnecting the AC voltage to a bell (1) when the current through the bell has its zero crossing, and a discharge circuit (11) for the discharging the bell before it is connected via a relay (3) to a SLIC circuit (4), such that the voltage across the bell is within the SLIC circuit voltage interval when the relay (3) connects the bell to the SLIC circuit (4), which occures when said signal is disconnected. By this arrangement an overvoltage protector (7) connected to the SLIC circuit (4) is not triggered, and the circuit is not subjected to any current transient which can cause disturbing clicking noises.

4 Claims, 1 Drawing Sheet

APPARATUS FOR CONNECTING AND DISCONNECTING A RINGING SIGNAL TO A CALLED SUBSCRIBER

TECHNICAL FIELD

The present invention relates to an apparatus in a telecommunication system for the ringing signalling to a called subscriber. Connection and disconnection of the signal takes place with the aid of the apparatus.

BACKGROUND ART

An apparatus is used in the prior art for regulating the connection and disconnection of a ringing signal to a called subscriber. The apparatus is described in the U.S. Pat. No. 4 145 577.

According to this patent the apparatus includes a two-way switching circuit connected in series to an AC voltage source which supplies an AC voltage at uniform intervals in the form of a ringing signal (hereinafter referred to as "call signal") to a called subscriber, a phase detector which detects the phase in the AC voltage and a control circuit connected to the phase detector for connecting and disconnecting the switching circuit synchronously with the output signal from the phase detector. The call signal to the subscriber starts at the AC voltage zero crossing and is interrupted when the current through the bell or buzzer has its zero crossing, thus preventing the occurence of undesired voltage transients.

DISCLOSURE OF INVENTION

The problem with the apparatus according to the mentioned US patent is that, even though the call signal is interrupted at the zero current crossing, certain disturbing current transients occur when the call signalling ceases. In the inventive apparatus a SLIC circuit (subscriber line interphase circuit) supplies current to the subscriber's telephone when it is in speech position, i.e. a call is in progress on it. If such a SLIC circuit is affected by the mentioned type of current transients, a disturbing clicking noise occurs in the telephone of a subscriber in speech position, where the latter is supplied with current by a SLIC circuit adjacent to the SLIC circuit in which the current transient occurred. The problem is explained in more detail with the aid of FIG. 1.

The apparatus in accordance with the invention is characterized by the claims, and solves the problem by its including a two-way switching circuit connected in series to an AC voltage generator, this switching circuit disconnecting the AC voltage to a bell or buzzer when the current through it has its zero pass, the apparatus also including a discharge circuit for discharging the bell circuit before it is connected to the SLIC circuit, so that the voltage across the bell circuit is within the voltage interval of the SLIC circuit, when a relay connects the bell circuit to the SLIC circuit, which occurs on interruption of the call signal. By this arrangement an overvoltage protector connected to the SLIC circuit is not triggered, and the transient current will be sufficiently low so that it will not cause disturbing clicking noises in adjacent communication paths connections.

Disturbing clicking noises have thus been eliminated, with the aid of the apparatus in accordance with the invention, in a technically very simple, and thus economically advantageous way.

BRIEF DESCRIPTION OF DRAWING

The apparatus in accordance with the invention will now be described in more detail with the aid of an embodiment example and with reference to the accompanying drawing, where.

BEST MODE FOR CARRYING OUT THE INVENTION

Figure 1:
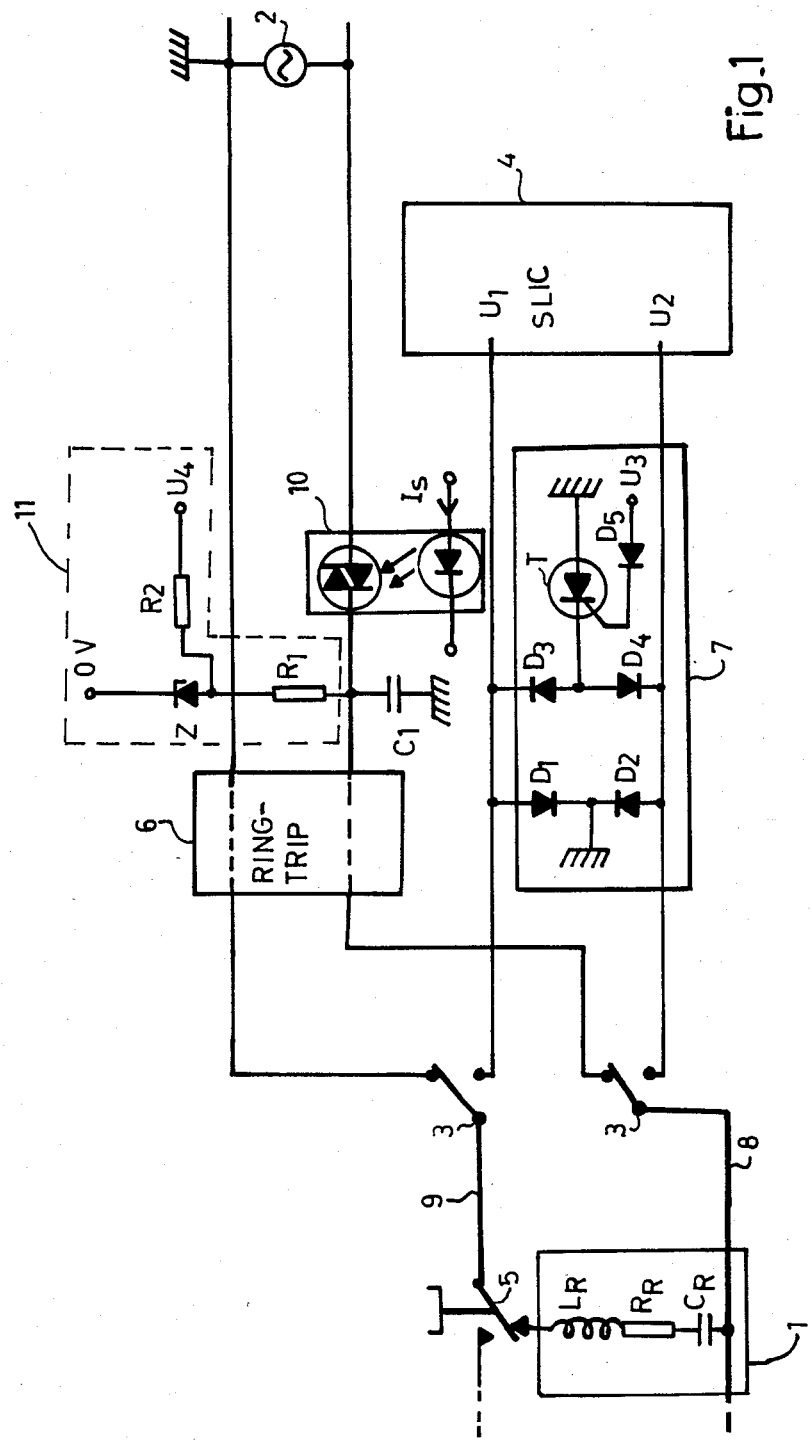
FIG. 1 is an apparatus in accordance with the invention for the call signal to a subscriber.

In FIG. 1 there is illustrated an example of a circuit for supplying a call signal to a subscriber. Signalling means in the form of a bell or buzzer 1 is associated with the subscriber's telephone, and for call signalling the means is alternatingly connected to or disconnected from, a call signal generator 2 with the aid of a relay 3, this relay connecting a SLIC circuit 4 to the bell when the call signal generator is disconnected. The telephone cradle contact 5 is depressed during call signalling and is connected to the bell 1. The call signal generator 2 delivers an AC voltage, e.g. with the frequency 20 Hz and effective value 65 V, to the bell 1 when the latter is connected to the ring generator via the relay 3. The relay is controlled by a clock signal so that the call signal sounds for one second, with the relay in its call signalling state (illustrated in the figure) and is interrupted for two seconds when the relay is in its SLIC-connecting state. A ring trip detector 6 detects whether the called subscriber answers, in which case the call signalling ceases and the relay changes position such that the SLIC-circuit 4 current feeds the subscriber which then is in speech position.

The circuit of the bell 1 includes a resistive part $R_R$, an inductive part $L_R$ and a capacitive part $C_R$, and due to that the voltage and current through the bell 1 not being in phase, there is a risk that the voltage through the bell is sufficient to cause the mentioned current transient towards the SLIC circuit, when the relay is connected to it, even though the relay leaves its call signalling state at the current zero crossing.

The SLIC cicruit 4 is inoperative during call signalling, having at one terminal the voltage U, e.g. corresponding to OV, and at its other terminal having the voltage $U_2$, e.g. corresponding to $-50$ V. An overvoltage protector 7, comprising the diodes $D_1$, $D_2$, $D_3$, $D_4$ and $D_5$ as well as a thyristor T, protect the SLIC circuit so that it is not subjected to voltages outside the SLIC circuit voltage interval, which lies within $+1V$ and $-62V$.

The overvoltage protector 7 is triggered if the voltage on either of the SLIC circuit terminals exceeds a diode voltage drop ($\approx +1V$) the diode $D_1$ or $D_2$ then short-circuiting the terminal to earth. The protector is also triggered if the voltage on either of the terminals reaches the voltage $U_3$ minus two diode voltage drops, the diode $D_5$ then exciting the thyristor T, which short-circuits the terminal to earth. The voltage $U_3$ corresponds to $-60V$, for example, which means that the protector is triggered if the voltage reaches $-62V$. If, when the relay 3 connects the SLIC circuit, the voltages at the terminals 8, 9 of the bell 1 differ from the voltages $U_1$, $U_2$ at the terminals of the SLIC circuit by so much that the overvoltage protector is triggered, a current transient occurs in the conductor between the bell and the SLIC circuit. The size of the transient is responsive to the characteristic impedance of the conductor and the voltage difference in the closing instant, and it is transmitted by crosstalk to adjacent SLIC circuits in the form of a secondary current transient. Each subscriber telephone has its own SLIC circuit supplying current to it when it is in speech position. If the adjacent SLIC circuit supplies current to its engaged subscriber telephone simultaneously as the mentioned secondary transient current occurs, disturbing clicking noises can be heard in this telephone. The clicking noise is caused by the adjacent SLIC circuit not being able to maintain the supply voltage $U_1$, $U_2$ constant as a result of the secondary transient current going into the SLIC circuit, which is low-ohmic when its telephone is in speech position. The clicking noise will be extra loud if the secondary transient current exceeds a level at which a current limiting circuit (not illustrated in the figure) in the SLIC circuit is triggered, resulting in that the voltages $U_1$, $U_2$ at the terminals of the adjacent SLIC circuit are altered so much that the overvoltage protector is triggered and short-circuits the terminals, thus causing a noise.

The disturbances from the called subscriber thus cause problems in the SLIC circuits of the adjacent channels. A subscriber in speech position on an adjacent channel thus hears the clicking noise in his engaged telephone when the relay of the called subscriber in the neighbouring channel assumes its SLIC-connecting state.

The problem with clicking noise has been noticed after SLIC circuits implemented with semiconductors have been introduced into telephony systems. These SLIC circuits are very sensitive to transient currents. resulting in that the mentioned current restricting protector is activated for a relatively low current level, resulting in the SLIC circuit not being able to maintain the voltages $U_1$, $U_2$ constant, and thus causing the clicking noise as described above.

For solving the problem, an apparatus in accordance with the invention has been connected to the call signal generator 2. The apparatus includes a two-way switching circuit 10 comprising an optotriac, e.g. an MOC3041, with a zero crossing detector, this optotriac being connected to the call signal generator 2 such that for a wait in call signalling it interrupts the AC voltage to the bell 1 when the current through the bell is zero, no magnetic energy thus being stored in the inductive part $L_R$, and for starting call signalling when the voltage across the optotriac has its zero crossing. The optotriac 10 is energised by a control current $I_S$, and is then conductive at the first voltage zero crossing, after the control current $I_S$ has been connected, and it ceases being conductive at the first current zero crossing after the control current $I_S$ has been disconnected.

Due to the fact that voltage and current in the circuit of the bell 1 not being in phase there is, as previously mentioned, a risk of the capacitive part $C_R$ of the circuit being sufficiently charged at the current zero crossing for being able to transmit a current transient to the SLIC circuit 4 when the relay 3 closes towards it, with resulting disturbing clicking noise. To avoid these disturbances, the apparatus in accordance with the invention also includes a discharge circuit 11, which ensures that the voltage across the bell 1 is within a given voltage interval narrower than the voltage interval in which the overvoltage protector 7 is not triggered before the relay 3 breaks off its call signalling state. When the relay then assumes the SLIC-connecting state no current transient occurs to which the previously described problems can be ascribed.

The following occurs for an interruption in call signalling. Before the relay 3 breaks off its call signalling state, the control current $I_S$ is disconnected, the optotriac 10 then becoming non-conductive at the first current zero pass. The capacitive part C of the bell circuit is then discharged through a resistor R, and a Zener diode Z in the discharge circuit 11. The Zener diode Z, which is connected to 0V is conductive in its reverse direction when the voltage drop across it is greater than $-50V$ and in its forward direction when the voltage exceeds a diode voltage drop. If the potential at point 8 is negative and greater than $-50V$, then the capacitor $C_R$ discharges through the resistor $R_1$ and the Zener diode Z until the negative potential at point 8 is less than $-50V$. After the discharge the voltage across the bell is within the voltage interval in which the overvoltage protector 7 is not triggered. On the other hand, if the potential at point 8 is positive and exceeds a diode voltage drop, the Zener diode is conductive in its forward direction and the capacitor $C_R$ is discharged via the resistor $R_1$ and the Zener diode Z until the potential at point 8 falls below a diode voltage drop, the voltage across the bell 1 after the discharge being within the voltage interval of the SLIC circuit, since the potential at point 9 is 0V. When the discharge mentioned has taken place, e.g. 100 ms after the control current $I_S$ has been disconnected, the relay 3 can depart from its call signalling state and switch over to its SLIC-connection state without the overvoltage protector being triggered.

The discharge circuit also includes a resistor $R_2$, with high resistance, connected to a battery voltage $U_4$. When the Zener diode is non-conductive, current passes through the resistor $R_1$, and through the resistor $R_2$. The battery voltage $U_4$ is $-60V$, for example. The resistor $R_2$ has great resistance so that the power consumption will be small when the Zener diode is non-conductive.

When the call signal is once again connected after a 2-second wait, the following takes place. The relay 3 returns again to its call signalling state from its SLIC-connection state. The voltage across the bell 1 then corresponds to the SLIC circuit voltages $U_1$, $U_2$. In order that this voltage across the bell will not cause a high voltage derivative across the optotriac 10 when the relay returns to its call signalling state, a capacitor C is connected between the optotriac 10 and earth. The voltage across the optotriac 10 increases slowly as the capacitor $C_1$ is charged, which prevents the optotriac becoming self-excited when the relay goes from its SLIC-connecting state to its call signalling state. When the capacitor $C_1$ has been charged, which takes place within 10 ms after the relay has assumed its call signalling state, the control current $I_S$ is connected, the optotriac then beginning to be conductive at the first voltage zero crossing after connection of the control current $I_S$. The bell is then once again fed with AC voltage from the call signalling generator, and the call signal sounds.

The call signal generator 2, optotriac 10, discharge circuit 11 and capacitor $C_1$ can be common to several subscriber telephones. If several subscribers are called up simultaneously, they use the voltage source 2 alternatingly, the call signal to a first subscriber being connected when there is an interruption in signalling, to a second subscriber.

I claim:

1. Apparatus in a telecommunication system for connecting and disconnecting a ringing signal to a called subscriber, such that for ringing a signalling means is alternatingly connected to an AC voltage source, said ringing signal then starting, and to a semiconductor circuit, whereupon said ringing signal is interrupted, characterized in that for preventing the occurrence of current transients when the signalling means (1) is connected to the semiconductor circuit (4), said apparatus includes a two-way switching circuit (10) connected in series to said AC voltage source (2) for disconnecting the AC voltage to the signalling means when the current through it has zero crossing, and a discharge circuit (11) connected to said signalling means (1) for discharging said means before said means is connected to the semiconductor circuit (4), such that the voltage across said signalling means at a connection to said semiconductor circuit lies within a given voltage interval.

2. Apparatus as claimed in claim 1, characterized in that said discharge circuit (11) includes a first resistor ($R_1$) and a Zener diode (Z) which is conductive when the voltage across the signalling means (1) is outside said given voltage interval, said discharge circuit discharging said signalling means via the first resistor ($R_1$) and Zener diode (Z).

3. Apparatus as claimed in claim 1, characterized in that said switching circuit (10) comprises a two-way optotriac with a zero crossing detector for connecting and disconnecting said ringing signal.

4. Apparatus as claimed in claim 3, characterized in that a capacitor ($C_1$) is connected between said switching circuit (10) and earth, said capacitor becoming charged at the start of the ringing signal for protecting the switching circuit from self-excitation.

* * * * *